(12) United States Patent
Sugihara

(10) Patent No.: US 10,370,478 B2
(45) Date of Patent: Aug. 6, 2019

(54) METHOD FOR PRODUCING ALKENYL ETHER POLYMER

(71) Applicant: Maruzen Petrochemical Co., Ltd., Chuo-ku (JP)

(72) Inventor: Shinji Sugihara, Fukui (JP)

(73) Assignee: Maruzen Petrochemical Co., Ltd., Chuo-ku (JP)

( * ) Notice: Subject to any disclaimer, the term of this patent is extended or adjusted under 35 U.S.C. 154(b) by 80 days.

(21) Appl. No.: 15/572,384

(22) PCT Filed: May 2, 2016

(86) PCT No.: PCT/JP2016/063527
§ 371 (c)(1),
(2) Date: Nov. 7, 2017

(87) PCT Pub. No.: WO2016/181872
PCT Pub. Date: Nov. 17, 2016

(65) Prior Publication Data
US 2018/0118869 A1 May 3, 2018

(30) Foreign Application Priority Data

May 8, 2015 (JP) ................................ 2015-095794

(51) Int. Cl.
*C08F 16/26* (2006.01)
*C08F 293/00* (2006.01)
(Continued)

(52) U.S. Cl.
CPC ............ *C08F 293/005* (2013.01); *C08F 4/40* (2013.01); *C08F 16/26* (2013.01); *C08F 18/08* (2013.01);
(Continued)

(58) Field of Classification Search
CPC ............ C08F 216/1416; C08F 2438/03; C08F 218/08; C08F 216/08
See application file for complete search history.

(56) References Cited

U.S. PATENT DOCUMENTS 5,190,989 A 3/1993 Himori
6,545,098 B1 4/2003 Bouhadir et al.
(Continued)

FOREIGN PATENT DOCUMENTS

EP 2 816 065 A1 12/2014
JP 60-240710 A 11/1985
(Continued)

OTHER PUBLICATIONS

International Search Report dated Jul. 26, 2016, in PCT/JP2016/063527, filed May 2, 2016.
(Continued)

*Primary Examiner* — Mark S Kaucher
(74) *Attorney, Agent, or Firm* — Oblon, McClelland, Maier & Neustadt, L.L.P.

(57) ABSTRACT

To provide a method for producing a polymer that is capable of providing an alkenyl ether polymer having a molecular weight, a molecular weight distribution, and a composition that are controlled, with a vinyl ether having a hydroxyl group, and a block copolymer thereof. To provide a polymer obtained by the method as a macro chain transfer agent capable of performing reversible addition fragmentation chain transfer polymerization. Livingness can be imparted to radical polymerization of a hydroxyl group-containing vinyl ether by performing the radical polymerization in the presence of a particular RAFT agent and a radical polymerization initiator, and a block copolymer with another radically polymerizable vinyl monomer can be obtained by using the resulting living polymer as a macro chain transfer agent (Continued)

capable of performing reversible addition fragmentation chain transfer polymerization.

12 Claims, 6 Drawing Sheets

(51) Int. Cl.
  *C08F 18/08*   (2006.01)
  *C08F 4/40*   (2006.01)
  *C08F 216/14*   (2006.01)
  *C08F 218/08*   (2006.01)

(52) U.S. Cl.
  CPC ...... *C08F 216/1416* (2013.01); *C08F 218/08* (2013.01); *C08F 2438/03* (2013.01); *C08F 2800/10* (2013.01)

(56) References Cited

U.S. PATENT DOCUMENTS

| | | |
|---|---|---|
| 2002/0198347 A1 | 12/2002 | Adam et al. |
| 2013/0190473 A1 | 7/2013 | Nagasawa et al. |
| 2015/0005467 A1 | 1/2015 | Sugihara et al. |

FOREIGN PATENT DOCUMENTS

| | | |
|---|---|---|
| JP | 64-111 A | 1/1989 |
| JP | 2002-500251 A | 1/2002 |
| JP | 2002-253286 A | 9/2002 |
| JP | 2005-503452 A | 2/2005 |
| JP | 2005-112980 A | 4/2005 |
| JP | 2013-40116 A | 2/2013 |
| JP | 2013-40245 A | 2/2013 |
| JP | 2013-148798 A | 8/2013 |
| JP | 2013-166829 A | 8/2013 |
| JP | 2013-237748 A | 11/2013 |
| WO | 99/35177 A1 | 7/1999 |
| WO | 02/090409 A2 | 11/2002 |
| WO | 03/037945 A1 | 5/2003 |
| WO | 2013/122106 A1 | 8/2013 |

OTHER PUBLICATIONS

Graeme Moad et al., "Living Radical Polymerization by the RAFT Process", Aust. J. Chem., vol. 58, 2005, pp. 379-410.

Graeme Moad et al., "Radical addition-fragmentation chemistry in polymer synthesis", Polymer, vol. 49, 2008, pp. 1079-1131.

Extended European Search Report dated Nov. 15, 2018 in Patent Application No. 16792597.3, 5 pages.

Korean Office Action dated Oct. 10, 2018 in Korean Patent Application No. 10-2017-7033862 (with English translation), 13 pages.

(A) V-601, (B) CMPCD, (C) poly(HEVE)

(A) poly(HEVE), (B) HEVE-r-VA copolymer, (C) PVA

METHOD FOR PRODUCING ALKENYL ETHER POLYMER

TECHNICAL FIELD

The present invention relates to a method for producing an alkenyl ether polymer, and more specifically relates to a method for producing an alkenyl ether polymer having a molecular weight, a molecular weight distribution, and a composition that are controlled, through living radical polymerization using an alkenyl ether having a hydroxyl group.

BACKGROUND ART

A polymer of a vinyl ether is one of useful monomers since the polymer is used as an adhesive, a coating material, a lubricant, an elastomer, grease, and the like. In particular, a polyvinyl ether having a hydroxyl group on the side chain thereof, has characteristics including hydrophilicity, adhesiveness to a substrate, crosslinking reactivity, and the like, and is expected to be applied to various purposes. Furthermore, the polyvinyl ether having a hydroxyl group on the side chain thereof greatly changes in the hydrophilicity and hydrophobicity thereof, and thus is also useful as a temperature responsive polymer.

A copolymer of a vinyl ether and another polymerizable monomer can have another property of the additional polymer imparted thereto in addition to the properties of the vinyl ether, and in particular, a block copolymer thereof can be utilized as a polymer surfactant, a thermoplastic elastomer, a coating material, an adhesive, a template agent for lithography, and the like. However, since a vinyl ether generally has an electron donating substituent and is cationically polymerizable, it is difficult to provide a copolymer with a radically polymerizable monomer, and various investigations have been made for providing the copolymer.

For example, as a method for providing a block copolymer of a cationically polymerizable vinyl ether and a radically polymerizable monomer, such a method has been proposed that living cation polymerization of a vinyl ether is performed with a vinyl ether having a group capable of undergoing reversible addition fragmentation chain transfer polymerization as an initiating species, and living radical polymerization of a radically polymerizable vinyl monomer is performed with the resulting polyvinyl ether as a macro chain transfer agent (PTL 1). However, with a vinyl ether having a hydroxyl group, the hydroxyl group inhibits cation polymerization, and thus a block copolymer cannot be obtained by the method.

A vinyl ether having a hydroxyl group can be reduced in electron donating property by using an aqueous solvent, such as an alcohol, through hydrogen bond between the aqueous solvent and the hydroxyl group, and thereby a polymer can be obtained by radical polymerization (PTL 2). However, the radical polymerizability of the vinyl ether having a hydroxyl group is lower than the other radically polymerizable monomers, and in this method, it is difficult to provide a copolymer of a vinyl ether having a hydroxyl group and another radically polymerizable monomer, particularly a copolymer having a molecular weight, a molecular weight distribution, and a compositional ratio that are controlled.

As a method for providing a polymer having a molecular weight, a molecular weight distribution, and a composition that are controlled with a radically polymerizable monomer, the living radical polymerization methods, such as atom transfer radical polymerization (ATRP) and reversible addition fragmentation chain transfer polymerization (RAPT polymerization), have been widely known. In particular, RAFT polymerization is featured by the use of a polymerization initiator and a reversible addition fragmentation chain transfer agent (RAFT agent) and has relatively high versatility as compared to other living radical polymerization, in such points as (1) the applicability to various monomers and (2) the wide range of application in reaction condition.

The RAFT agent used may be a thiocarbonylthio compound (R-SC(S)Z) containing a moiety (R) forming a radical through addition fragmentation and a moiety (Z) adjacent to the thiocarbonyl group, and for imparting livingness to radical polymerization, it is necessary to select the optimum RAFT agent depending on the reactivity of the monomer. For general vinyl monomers having radical polymerizability, the selection standards have been established for a wide range of monomers, and for example, it has been known that a high active RAFT agent, such as a dithioester and a trithiocarbonate, is suitable for a conjugated monomer, such as a methacrylate ester, styrene, an acrylate ester, acrylic acid, acrylamide, and acrylonitrile, and a low active RAFT agent, such as a dithiocarbamate and a xanthate, is suitable for an unconjugated monomer, such as vinyl acetate, N-vinylpyrrolidone, and an N-carbazole (NPLs 1 and 2). However, there has been no example of RAFT polymerization considered for a vinyl ether having a hydroxyl group, and there has been no knowledge about the polymerizability thereof in the presence of a RAFT agent, a suitable RAFT agent, and the like.

CITATION LIST

Patent Literatures

PTL 1: JP-A-2013-040245
PTL 2: JP-A-2013-166829

Non-Patent Literatures

NPL 1: Aust. J. Chem., 2005, 58, 379-410
NPL 2: Polymer, 2008, 49, 1079-1131

SUMMARY OF INVENTION

Technical Problem

Accordingly, an object of the invention is to provide a method for producing a polymer that is capable of providing an alkenyl ether polymer having a molecular weight, a molecular weight distribution, and a composition that are controlled, with a vinyl ether having a hydroxyl group, and a block copolymer thereof. Another object of the invention is to provide a polymer obtained by the method as a macro chain transfer agent.

Solution to Problem

As a result of earnest investigations made by the inventors for solving the problems, it has been found that livingness can be imparted to radical polymerization of a hydroxyl group-containing vinyl ether by performing the radical polymerization in the presence of a particular RAFT agent and a radical polymerization initiator, and a block copolymer with another radically polymerizable vinyl monomer can be obtained by using the resulting living polymer as a macro chain transfer agent, and thus the invention has been completed.

The invention provides a method for producing an alkenyl ether polymer, containing at least performing living radical polymerization of an alkenyl ether having a hydroxyl group represented by the following formula (2):

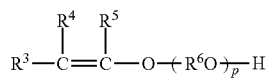
(2)

wherein $R^3$, $R^4$, and $R^5$ each independently represent a hydrogen atom or an alkyl group; $R^6$ represents a linear or branched alkylene group or an alkylene group containing an alicyclic structure; and p represents 1, 2, or 3, in the presence of a dithiocarbamate ester represented by the following formula (1) as a chain transfer agent and a radical polymerization initiator:

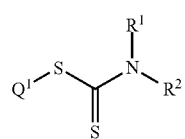
(1)

wherein $Q^1$ represents a functional group capable of activating vinyl carbon for free radical addition through detachment as a radical; and $R^1$ and $R^2$ and each independently represent an alkyl group, an aryl group, or a nitrogen-containing heterocyclic group, in which $R^1$ and $R^2$ may be bonded to each other to form a heterocyclic ring.

The invention also provides a macro chain transfer agent containing at least an end structure containing a dithiocarbamate group represented by the following formula (3):

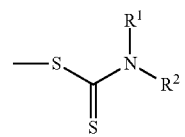
(3)

wherein $R^1$ and $R^2$ each independently represent an alkyl group, an aryl group, or a nitrogen-containing heterocyclic group, or $R^1$ and $R^2$ may be bonded to each other to form a heterocyclic ring, and a repeating unit derived from a hydroxyl group-containing alkenyl ether represented by the following formula (4):

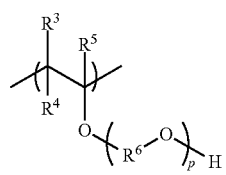
(4)

wherein $R^3$, $R^4$, and $R^5$ each independently represent a hydrogen atom or an alkyl group; $R^4$ represents a linear or branched alkylene group or an alkylene group containing an alicyclic structure; and p represents 1, 2, or 3, and further provides a method for producing a block copolymer by using the macro chain transfer agent.

Advantageous Effects of Invention

According to the method for producing an alkenyl ether polymer of the invention, a hydroxyl group-containing alkenyl ether polymer having a molecular weight, a molecular weight distribution, and a composition that are controlled can be obtained by a convenient method. Furthermore, by using the resulting polymer of a hydroxyl group-containing alkenyl ether as a macro chain transfer agent, various block copolymers of a hydroxyl group-containing alkenyl ether and a radically polymerizable monomer can be produced.

DESCRIPTION OF EMBODIMENTS

Figure 1:
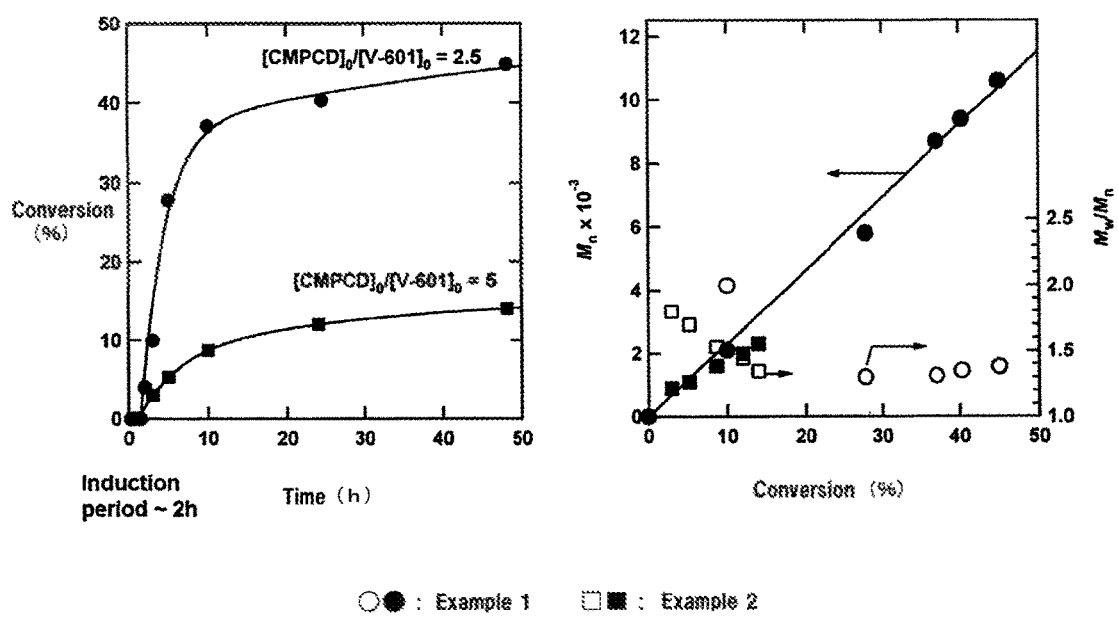
FIG. 1 is diagrams showing the change of monomer conversion with respect to the polymerization time and the change of the number average molecular weight Mn and the molecular weight distribution Mw/Mn of the polymers with respect to the monomer conversion in Examples 1 and 2.

Preferred embodiments of the invention will be described below.

(1) Method for Producing Polymer

The method for producing an alkenyl ether polymer of the invention is performed by polymerizing an alkenyl ether having a hydroxyl group represented by the formula (2) through living radical polymerization in the presence of a dithiocarbamate ester represented by the formula (1) as a chain transfer agent and a radical polymerization initiator (method (A)).

In the method (A) of the invention, the following polymerization materials are used.

Chain Transfer Agent

The chain transfer agent used in the method (A) (which is hereinafter referred to as a "RAFT agent") is selected from a dithiocarbamate ester represented by the formula (1). In the formula (1), the functional group represented by $Q^1$ is preferably a group represented by the following formula (1a):

wherein $X^1$ represents a cyano group, an aryl group, an alkoxycarbonyl group, a carboxyl group, or an N-substituted carbamoyl group; and $R^a$ and $R^b$ each independently represent a hydrogen atom, a halogen atom, an alkyl group, an aryl group, an alkoxycarbonyl group, —$(CH_2)_k$—OH, or —$(CH_2)_k$—COOY (wherein Y represents a hydrogen atom or an N-succinimidyl group; and k represents an integer of from 1 to 5).

In the formula (1a), the aryl group represented by $X^1$ is preferably an aryl group having a number of carbon atoms of from 6 to 14, and specific examples thereof include a phenyl group and a naphthyl group. The alkoxycarbonyl group is preferably an alkoxycarbonyl group having a number of carbon atoms of from 2 to 5, and specific examples thereof include a methoxycarbonyl group, an ethoxycarbonyl group, a n-propoxycarbonyl group, an isopropoxycarbonyl group, a n-butoxycarbonyl group, an isobutoxycarbonyl group, a sec-butoxycarbonyl group, and a tert-butoxycarbonyl group. The N-substituted carbamoyl group is preferably a mono- or dialkylcarbamoyl group substituted by an alkyl group having a number of carbon atoms of from 1 to 4, and specific examples thereof include a monoalkylcarbamoyl group, such as an N-methylcarbamoyl group, an N-ethylcarbamoyl group, an N-propylcarbamoyl group, and N-isopropylcarbamoyl group; and a dialkylcarbamoyl group, such as an N,N-dimethylcarbamoyl group, an N,N-diethylcarbamoyl group, an N,N-dipropylcarbamoyl group, and an N,N-diisopropylcarbamoyl group, $X^1$ is preferably a cyano group, a phenyl group, or an ethoxycarbonyl group, and particularly preferably a cyano group.

In the formula (1a), specific examples of the halogen atom represented by $R^a$ and $R^b$ include a fluorine atom and a chlorine atom. The alkyl group is preferably an alkyl group having a number of carbon atoms of from 1 to 4, and specific examples thereof include a methyl group, an ethyl group, a n-propyl group, an isopropyl group, a n-butyl group, an isobutyl group, and a tert-butyl group. Examples of the aryl group and the alkoxycarbonyl group include the same ones as exemplified for $X^1$. $R^a$ and $R^b$ each are preferably a hydrogen atom or a methyl group, and particularly preferably a hydrogen atom.

Preferred specific examples of the functional group $Q^1$ represented by the formula (1a) include a cyanomethyl group, a 1-cyanoethyl group, a 2-cyanopropan-2-yl group, and a benzyl group, and a cyanomethyl group is particularly preferred from the standpoint of the reactivity and the easiness of polymerization control.

In the formula (1), the alkyl group represented by $R^1$ and $R^2$ is preferably an alkyl group having a number of carbon atoms of from 1 to 4, and specific examples thereof include a methyl group, an ethyl group, a n-propyl group, an isopropyl group, a n-butyl group, an isobutyl group, and a tert-butyl group. The aryl group is preferably an aryl group having a number of carbon atoms of from 6 to 20, and specific examples thereof include a phenyl group and a naphtyl group.

In the formula (1), the nitrogen-containing heterocyclic group represented by $R^1$ and $R^2$ is preferably a nitrogen-containing heterocyclic group having a number of carbon atoms of from 4 to 14, and specific examples thereof include a pyridyl group, a pyrimidyl group, a pyrazyl group, a pyridazinyl group, a quinolyl group, an isoquinolyl group, a quinazolyl group, a quinoxalyl group, a naphthyridinyl group, a benzoquinolyl group, and a benzoisoquinolyl group, with a pyridyl group being preferred.

In the formula (1), the heterocyclic ring formed by bonding $R^1$ and $R^2$ is preferably a 5- to 10-membered monocyclic or polycyclic heterocyclic ring, and specific examples thereof include a monocyclic heterocyclic ring, such as a pyrrole ring, a pyrroline ring, a pyrrolidine ring, an imidazole ring, an imidazoline ring, a pyrazole ring, and a pyrazoline ring, and a bicyclic heterocyclic ring, such as an indole ring, an isoindole ring, an indoline ring, an isoindoline ring, a benzimidazole ring, and a 1H-indazole ring, with a pyrrole ring being preferred.

More preferred examples of $R^1$ and $R^2$ include a methyl group, a phenyl group, and a pyridyl group, and a methyl group and a phenyl group are particularly preferred.

Specific examples of the dithiocarbamate ester represented by the formula (1) include
S-cyanomethyl-N-methyl-N-phenylcarbamodithioate,
S-cyanomethyl-N,N-diphenylcarbamodithioate,
1-succinimidyl-4-cyano-4-[N-methyl-N-(4-pyridyl)carbamothioylthio]pentanoate,
S-2-cyanopropan-2-yl-N-methyl-N-(4-pyridyl)carbamodithioate,
S-cyanomethyl-N-methyl-N-(4-pyridyl)carbamodithioate,
methyl 2-[N-methyl-N(pyridin-4-yl)carbamothioylthio]propanoate, and benzyl 1H-pyrrole-1-carbodithioate. These RAFT agents may be used solely or in combination of two or more kinds thereof.

Among these RAFT agents,
S-cyanomethyl-N,N-diphenylcarbamodithioate,
S-cyanomethyl-N-methyl-N-phenylcarbamodithioate, and benzyl 1H-pyrrole-1-carbodithioate are more preferred, and S-cyanomethyl-N-methyl-N-phenylcarbamodithioate is particularly preferred, from the standpoint of the reactivity and the easiness of polymerization control.

The amount of the RAFT agent used is not particularly limited and may be appropriately determined depending on the kind and the amount of the monomer used, the polymerization conditions, such as the polymerization temperature and the polymerization concentration, the molecular weight of the target polymer, and the like, and for providing a polymer having a weight average molecular weight of from several thousands to several tens of thousands, the amount thereof is preferably in a range of from 0.01 to 10% by mol, and more preferably in a range of from 0.1 to 5% by mol, based on the total amount of the monomer.

Radical Polymerization Initiator

The radical polymerization initiator used in the method (A) is not particularly limited as far as the initiator forms a radical with heat, and can be appropriately selected from the general radical polymerization initiators, such as a peroxide and an azo compound, depending on the polymerization temperature, the kinds of the solvent and the monomer, and the like.

Examples of the peroxide as the radical polymerization initiator (which may be hereinafter abbreviated as a "polymerization initiator") include t-butyl hydroperoxide, cumene hydroperoxide, t-butyl peroxyacetate, t-butyl peroxybenzoate, t-butyl peroxyoctanoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, and ammonium persulfate.

Examples of the azo compound include an oil soluble azo compound, such as 2,2'-azobistisobutyronitrile); 2,2'-azobis (4-methoxy-2,4-dimethylvaleronitrile), 2,2'-azobis(2,4-dimethylvaleronitrile), dimethyl 2,2'-azobis(2-methylpropionate), 2,2'-azobis(2-methylbutyronitrile), 1,1'-azobis (cyclohexanecarbonitrile), 2,2'-azobis[N-(2-propenyl)-2-methylpropionamide], and 2,2'-azobis(N-butyl-2-methylpropionamide), and a water soluble azo compound, such as 2,2'-azobis[2-(2-imidazolin-2-yl)propane] dihydrochloride, 2,2'-azobis[2-(2-imidazolin-2-yl)propane] disulfate dihydrate, 2,2'-azobis(2-methylpropionamide)dihydrate, 2,2'-azobis[N-(2-carboxyethyl)-2-methylpropionamide] tetrahydrate, 2,2'-azobis[2-(2-imidazolin-2-yl)propane], 2,2'-azobis[2-methyl-N-(2-hydroxyethyl)propionamide], and 2,2'-azobis[1-imino-1-pyrrolidino-2-methylpropane] dihydrochloride. These polymerization initiators may be used solely or as a combination of two or more kinds thereof.

Among the polymerization initiators, an azo compound is preferred, an azo compound that does not have a cyano group is more preferred, and dimethyl 2,2'-azobis(2-methylpropionate) is particularly preferred, from the standpoint of the reactivity and the easiness of polymerization control.

The amount of the polymerization initiator used is not particularly limited and may be appropriately determined depending on the kind and the amount of the monomer used, the polymerization conditions, such as the polymerization temperature and the polymerization concentration, the molecular weight of the target polymer, and the like, and for providing a polymer having a weight average molecular weight of from several thousands to several tens of thousands, the amount thereof is preferably in a range of from 0.01 to 10% by mol, and more preferably in a range of from 0.05 to 5% by mol, based on the total amount of the monomer.

Alkenyl Ether

The alkenyl ether used as a monomer in the method (A) is selected from the compounds represented by the formula (2). In the formula (2), the alkyl group represented by $R^3$, $R^4$ and $R^5$ is preferably an alkyl group having a number of carbon atoms of from 1 to 4, and specific examples thereof include a methyl group, an ethyl group, a n-propyl group, an isopropyl group, a n-butyl group, an isobutyl group, and a tert-butyl group.

The linear or branched alkylene group represented by $R^6$ is preferably a linear or branched alkylene group having a number of carbon atoms of from 2 to 8, and specific examples thereof include an ethylene group, a 1,2-propylene group, a 1,3-propylene group, a 1,4-butylene group, a 1,5-pentylene group, a neopentylene group, a 1,6-hexylene group, a 4-methyl-2,2-pentylene group, a 3-methyl-1,5-pentylene group, and a 2,3-dimethyl-2,3-butylene group. Among these, an alkylene group having a number of carbon atoms of from 2 to 4, such as an ethylene group, a 1,2-propylene group, a 1,3-propylene group, and a 1,4-butylene group, is preferred, and an ethylene group is particularly preferred.

The alkylene group containing an alicyclic structure represented by $R^6$ is preferably an alkylene group containing a monocyclic alicyclic structure, and more preferably an alkylene group containing a 5- to 6-membered alicyclic structure, and specific examples thereof include a 1,2-cyclopentylene group, a 1,3-cyclopentylene group, a 1,2-cyclohexylene group, a 1,3-cyclohexylene group, a 1,4-cyclohexylene group, a 1,2-cyclopentanedimethylene group, a 1,3-cyclopentanedimethylene group, a 1,2-cyclohexanedimethylene group, a 1,3-cyclohexanedimethylene group, and a 1,4-cyclohexanedimethylene group.

In the formula (2), the number of repetition p of the oxyalkylene group is preferably 1 or 2, and particularly preferably p=1, from the standpoint of the polymerizability.

Specific examples of the alkenyl ether represented by the formula (2) include a vinyl ether compound, such as 2-hydroxyethyl vinyl ether, 3-hydroxypropyl vinyl ether, propylene glycol monovinyl ether, 1-hydroxypropan-2-yl vinyl ether, 4-hydroxybutyl vinyl ether, diethylene glycol monovinyl ether, dipropylene glycol monovinyl ether, triethylene glycol monovinyl ether, 4-hydroxycyclohexyl vinyl ether, and 1,4-cyclohexanedimethanol monovinyl ether; and a propenyl ether compound, such as 2-hydroxyethyl propenyl ether, 2-hydroxypropyl propenyl ether, propylene glycol monopropenyl ether, 1-hydroxypropan-2-yl propenyl ether, 4-hydroxybutyl propenyl ether, diethylene glycol monopropenyl ether, dipropylene glycol monopropenyl ether, triethylene glycol monopropenyl ether, 4-hydroxycyclohexyl propenyl ether, and 1,4-cyclohexanedimethanol monopropenyl ether. These alkenyl ethers may be used solely or as a combination of two or more kinds thereof.

Preferred examples of the alkenyl ether include a vinyl ether compound from the standpoint of the reactivity and the easiness of polymerization control, and a vinyl ether containing a linear alkylene group or an alkylene oxyalkylene group, having a number of carbon atoms of approximately from 2 to 4, such as 2-hydroxyethyl vinyl ether, diethylene glycol monovinyl ether, and 4-hydroxybutyl vinyl ether, is more preferred, with 2-hydroxyethyl vinyl ether being particularly preferred.

Radically Polymerizable Vinyl Monomer

In the method (A) of the invention, a radically polymerizable vinyl monomer that is different from the alkenyl ether represented by the formula (2) may be copolymerized as needed.

The radically polymerizable vinyl monomer (which may be hereinafter abbreviated as a "vinyl monomer") used in the method (A) may be specifically at least one monomer selected from the group consisting of styrene and a styrene derivative, (meth)acrylic acid and a (meth)acrylic acid derivative, (meth)acrylamide and a (meth)acrylamide derivative, (meth)acrylonitrile, isoprene, 1,3-butadiene, ethylene, vinyl acetate, vinyl chloride, vinylidene chloride, N-vinylindole, N-vinylphthalimide, N-vinylpyrrolidone, N-vinylcarbazole, and N-vinylcaprolactam.

Among these vinyl monomers, an unconjugated monomer, such as vinyl acetate, vinyl chloride, N-vinylindole, N-vinylphthalimide, vinylpyrrolidone, N-vinylcarbazole, and N-vinylcaprolactam, is preferred from the standpoint of the polymerizability.

In the case where the alkenyl ether and the vinyl monomer are copolymerized, the compositional ratio thereof may be appropriately determined depending on the target and the purpose without particular limitation, and in terms of molar ratio, is generally in a range of from 5/95 to 95/5, preferably in a range of from 10/90 to 90/10, and more preferably in a range of from 20/80 to 80/20.

Polymerization Solvent

The living radical polymerization may be performed in the presence or absence of a solvent, and solution polymerization using a solvent is industrially advantageous. In the case where the polymerization is performed by a solution polymerization method, the polymerization solvent used preferably is inert to the polymerization reaction, is capable of forming a hydrogen bond with the hydroxyl group of the alkenyl ether, and has a small chain transfer constant.

Examples of the solvent used include a monohydric alcohol, such as methanol, ethanol, isopropanol, n-butyl alcohol, isobutyl alcohol, tert-butyl alcohol, sec-butyl alcohol, and tetrahydrofurfuryl alcohol; a polyhydric alcohol, such as ethylene glycol, glycerin, and diethylene glycol; an ether alcohol, such as methyl cellosolve, cellosolve, isopropyl cellosolve, butyl cellosolve, ethylene glycol monomethyl ether, ethylene glycol monoethyl ether, diethylene glycol monomethyl ether, and diethylene glycol monoethyl ether; an alkylamide, such as dimethylformamide, dimethylacetamide, and N-methylpyrrolidone; an alkyl sulfoxide, such as dimethyl sulfoxide; a ketone, such as acetone and methyl ethyl ketone; and a cyclic ether, such as tetrahydrofuran and dioxane. Water may be used as the solvent. These solvents may be used solely or as a combination of two or more kinds thereof.

The amount of the solvent used is not particularly limited and is preferably from 10 to 1,000% by mass, and more preferably from 20 to 500% by mass, based on the total amount of the monomer.

Reaction Condition

The polymerization temperature for the living radical polymerization performed is preferably from −20° C. to 200° C., and more preferably from 40° C. to 160° C.

Polymer

The molecular weight of the alkenyl ether polymer obtained by the method (A) of the invention may be appropriately determined depending on the target and the purpose without particular limitation, and in terms of polystyrene conversion number average molecular weight (Mn) by a GPC analysis, is generally from 1,000 to 1,000,000, preferably from 2,000 to 500,000, and more preferably from 3,000 to 200,000. The molecular weight distribution (Mw/Mn) of the polymer is generally from 1.0 to 2.0, preferably from 1.0 to 1.8, and more preferably from 1.0 to 1.6. The molecular weight of the polymer can be controlled by the amounts of the RAFT agent and the radical initiator used.

The alkenyl ether polymer (living polymer) obtained by the method (A) of the invention contains an end structure derived from the dithiocarbamate ester represented by the formula (1) and a repeating unit derived from the alkenyl ether represented by the formula (2), and can be used as a macro chain transfer agent capable of performing reversible addition fragmentation chain transfer polymerization. A part of the resulting living polymer has an initiating end derived from the radical polymerization initiator, but this living polymer also has a terminal end structure derived from the RAFT agent, and thus can be used as a macro chain transfer agent capable of performing reversible addition fragmentation chain transfer polymerization.

(2) Macro Chain Transfer Agent

The macro chain transfer agent of the invention contains an end structure containing a dithiocarbamate group represented by the formula (3) and a repeating unit derived from an alkenyl ether having a hydroxyl group represented by the formula (4). The end structure containing a dithiocarbamate group represented by the formula (3) can be introduced through living radical polymerization with the dithiocarbamate ester represented by the formula (1) as a RAFT agent. The definitions of $R^1$ and in the formula (3) are the same as those in the formula (1), and the preferred embodiments thereof are as described in the section, (1) Method for Producing Polymer, Chain Transfer Agent.

The repeating unit derived from an alkenyl ether having a hydroxyl group represented by the formula (4) can be introduced through living radical polymerization with the alkenyl ether having a hydroxyl group represented by the formula (2). The definitions of $R^3$ to $R^6$ and the number of repetition p of the oxyalkylene group in the formula (4) are the same as those in the formula (2), and the preferred embodiments thereof are as described in the section.

(1) Method for Producing Polymer, Alkenyl Ether.

A preferred one of the macro chain transfer agent of the invention is represented by the following formula (5):

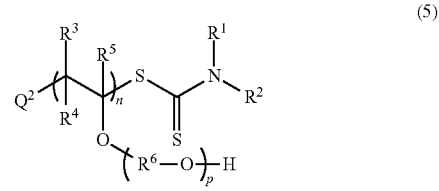

(5)

wherein $Q^2$ represents a functional group capable of activating vinyl carbon for free radical addition through detachment as a radical; $R^1$ and $R^2$ have the same definitions as in the formula (3); $R^3$, $R^4$, $R^5$, $R^6$ and p have the same definitions as in the formula (4); and n represents a number of repetition (polymerization degree) of an alkenyl ether unit.

In the formula (5), the number of repetition n of the alkenyl ether unit may be appropriately determined depending on the target and the purpose without particular limitation, and is generally from 5 to 1,000, preferably from 10 to 500, and more preferably from 20 to 300.

In the formula (5), the functional group represented by $Q^2$ has a structure derived from a radical detached from the RAFT agent or the radical polymerization initiator, and is preferably a group represented by the following formula (5a):

(5a)

wherein $X^2$ represents a cyano group, an aryl group, an alkoxycarbonyl group, a carboxyl group, or an N-substituted carbamoyl group; and $R^c$ and $R^d$ each independently represent a hydrogen atom, a halogen atom, an alkyl group, an aryl group, an alkoxycarbonyl group, —$(CH_2)_k$—OH, or —$(CH_2)_k$—COOY (wherein Y represents a hydrogen atom or an N-succinimidyl group; and k represents an integer of from 1 to 5).

In the formula (5a), the aryl group represented by $X^2$ is preferably an aryl group having a number of carbon atoms of from 6 to 14, and specific examples thereof include a phenyl group and a naphthyl group. The alkoxycarbonyl group is preferably an alkoxycarbonyl group having a number of carbon atoms of from 2 to 5, and specific examples thereof include a methoxycarbonyl group, an ethoxycarbonyl group, a n-propoxycarbonyl group, an isopropoxycarbonyl group, a n-butoxycarbonyl group, an isobutoxycarbonyl group, a sec-butoxycarbonyl group, and a tert-butoxycarbonyl group. The N-substituted carbamoyl group is preferably a mono- or dialkylcarbamoyl group substituted by an alkyl group having a number of carbon atoms of from 1 to 4, and specific examples thereof include a monoalkylcarbanoyl group, such as an N-methylcarbamoyl group, an N-ethylcarbamoyl group, an N-propylcarbamoyl group, and N-isopropylcarbamoyl group; and a dialkylcarbamoyl group, such as an N,N-dimethylcarbamoyl group, an N,N-diethylcarbamoyl group, an N,N-dipropylcarbamoyl group, and an N,N-diisopropylcarbamoyl group, $X^2$ is preferably a cyano group, a phenyl group, a methoxycarbonyl group, or an ethoxycarbonyl group, and particularly preferably a cyano group or a methoxycarbonyl group.

In the formula (5a), examples of the halogen atom represented by $R^c$ and $R^d$ include a fluorine atom and a chlorine atom. The alkyl group is preferably an alkyl group having a number of carbon atoms of from 1 to 4, and specific examples thereof include a methyl group, an ethyl group, a n-propyl group, an isopropyl group, a n-butyl group, an isobutyl group, and a tert-butyl group. Examples of the aryl group and the alkoxycarbonyl group include the same ones as exemplified for $X^2$. $R^c$ and $R^d$ each are preferably a hydrogen atom or a methyl group.

Preferred specific examples of the functional group $Q^2$ represented by the formula (5a) include a cyanomethyl group, a 1-cyanoethyl group, a 2-cyanopropan-2-yl group, a benzyl group, and a methoxycarbonyl group, and a cyanomethyl group and a 2-methoxycarbonylpropan-2-yl group are particularly preferred, from the standpoint of the reactivity and the easiness of polymerization control.

The macro chain transfer agent of the invention can foe obtained by the same living radical polymerization process as the method (A) described above, and the preferred embodiments thereof are as described in the section, (1) Method for Producing Polymer.

The macro chain transfer agent of the invention obtained above is capable of performing reversible addition fragmentation chain transfer polymerization, and can be favorably used as a macro chain transfer agent in a method for producing a block copolymer containing a polyalkyl ether unit having a hydroxyl group on the side chain thereof.

(3) Method for Producing Block Copolymer Using Macro Chain Transfer Agent

The production of the block copolymer of the invention is performed by polymerizing a radically polymerizable vinyl monomer through living radical polymerization in the presence of the macro chain transfer agent and a radical polymerization initiator (method (B).

The macro chain transfer agent used may be the reaction solution obtained by the method (A) as it is, or the macro chain transfer agent isolated therefrom. The amount of the macro chain transfer agent used in the method (B) is preferably such an amount that provides an amount of the terminal end derived from the RAFT agent in a range of from 0.01 to 10% by mol, and more preferably from 0.05 to 5% by mol, based on the total amount of the monomer.

The radical polymerization initiator used in the method (B) may be the same ones as described in the section, (1) Method for Producing Polymer, Radical Polymerization Initiator. Among the radical polymerization initiators, an azo compound is preferred, an azo compound that does not have a cyano group is more preferred, and dimethyl 2,2'-azobis(2-methylpropionate) is particularly preferred, from the standpoint of the reactivity and the easiness of polymerization control. The amount of the radical polymerization initiator used is preferably in a range of from 0.01 to 10% by mol, and more preferably in a range of from 0.02 to 5% by mol, based on the total amount of the monomer.

The radically polymerizable vinyl monomer used in the method (B) may be the alkenyl ether represented by the formula (2). The alkenyl ether may be the same as the alkenyl ether that constitutes the macro chain transfer agent or may be different therefrom.

As the radically polymerizable vinyl monomer, a vinyl monomer that is different from the alkenyl ether represented by the formula (2) may be used. The vinyl monomer may be the same ones as described in the section, (1) Method for Producing Polymer, Radically Polymerizable Vinyl Monomer.

Among the vinyl monomers, an unconjugated monomer, such as vinyl acetate, vinyl chloride, N-vinyl indole, N-vinylphthalimide, N-vinylpyrrolidone, N-vinylcarbazole, and N-vinylcaprolactam, is preferred from the standpoint of the polymerizability.

The living radical polymerization may be performed in the presence or absence of a solvent, and solution polymerization using a solvent is industrially advantageous. In the case where the polymerization is performed by a solution polymerization method, the solvent used may be the same ones as described in the section, (1) Method for Producing Polymer, Polymerization Solvent. The amount of the solvent used is not particularly limited and is preferably from 10 to 1,000% by mass, and more preferably from 20 to 500% by mass, based on the total amount of the monomer.

The polymerization temperature for the living radical polymerization in the method (B) is preferably from −20° C. to 200° C., and more preferably from 40° C. to 160° C.

A block copolymer having a segment containing an alkenyl ether unit derived from the macro chain transfer agent and a segment containing a vinyl monomer unit introduced through the living radical polymerization using the macro chain transfer agent is obtained by the method (B). The compositional ratio of the alkenyl ether unit and the vinyl monomer unit may be appropriately determined depending on the target and the purpose without particular limitation, and in terms of molar ratio, is generally in a range of from 5/95 to 95/5, preferably in a range of from 10/90 to 90/10, and more preferably in a range of from 20/80 to 80/20.

The molecular weight of the block copolymer may be appropriately determined depending on the target and the purpose without particular limitation, and in terms of polystyrene conversion number average molecular weight (Mn) by a GPC analysis, is generally from 1,050 to 2,000,000, preferably from 2,100 to 1,000,000, and more preferably from 3,150 to 400,000. The molecular weight distribution (Mw/Mn) of the block copolymer is generally from 1.0 to 2.6, preferably from 1.0 to 2.2, and more preferably from 1.0 to 1.8. The molecular weight of the block copolymer can be controlled by the amounts of the macro chain transfer agent and the radical initiator used.

The block copolymer obtained by the method (B) has an initiating end derived from the RAFT agent, or the initiator and a terminal end derived from the RAFT agent, and living radical polymerization of another radically polymerizable vinyl monomer may be further performed with the block copolymer as a macro chain transfer agent, thereby providing an ABA type triblock copolymer or an ABC type triblock copolymer.

The polymer and the block copolymer obtained by the production methods or the invention described above have a hydroxyl group on the side chain thereof, have characteristics including hydrophilicity, adhesiveness to a substrate, crosslinking reactivity, and the like, and can be favorably used as an adhesive, a coating material, an ink, a surfactant, a lubricant, an elastomer, grease, a modifier for a polymer, and the like. Furthermore, the polyvinyl ether having a hydroxyl group on the side chain thereof changes in the hydrophilicity and hydrophobicity thereof depending on temperatures, and thus is also useful as a temperature responsive polymer.

EXAMPLES

The invention will be described in more detail with reference to examples and a reference example below, but the invention is not limited to the examples and the like. The measurements in the examples were performed according to the following measurement methods.

(1) The analysis of the number average molecular weight (Mn) and the molecular weight distribution (Mw/Mn) of the polymer was performed by gel permeation chromatography (GPC).
Analysis Condition
  Column: TSKgel Column G-MHHR-M×2 (produced by Tosoh Corporation), or Shodex GPC KD804×3 (produced by Showa Denko K.K.)
  Solvent: dimethylformamide (containing 10 mmol/L of lithium bromide)
  Measurement temperature: 40° C.
  Flow rate: 1.0 mL/min
(2) The calculation of the monomer conversion and the structural analysis of the polymer were performed by $^1$H-NMR (JNM AL-300 or JNM ECX-500II, produced by JEOL, Ltd.) (solvent: deuterated methanol or deuterated water).

Example 1

Synthesis Example of poly(2-hydroxyethyl vinyl ether) (1)

4.0 g (45.4 mmol) of 2-hydroxyethyl vinyl ether (hereinafter referred to as "HEVE") was weighed in a test tube, and to the test tube, 0.021 g (0.091 mmol) of dimethyl 2,2'-azobis(2-methylpropionate) (V-601, a trade name, produced by Wako Pure Chemical Industries, Ltd., hereinafter referred to as "V-601") as a radical polymerization initiator and 0.050 g (0.23 mmol) of S-cyanomethyl-N-methyl-N-phenylcarbamodithioate (hereinafter referred to as "CMPCD") as a RAFT agent were added and sufficiently dissolved (HEVE/CMPCD/V-601=200/1/0.4). Subsequently, a stirring bar was added to the test tube, and nitrogen was blown into the test tube in an ice bath for deoxygenation. After the deoxygenation, the test tube was sealed, and the polymerization reaction was started in an oil bath at 70° C.

After elapsing an arbitrary polymerization time, a part of the reaction solution was drawn in a nitrogen atmosphere, and then cooled and exposed to the air for terminating the polymerization, and a part of the reaction solution was dissolved in deuterated water and subjected to the $^1$H-NMR analysis for calculating the monomer conversion. Furthermore, the drawn reaction solution was subjected to the GPC analysis for calculating the number average molecular weight Mn and the molecular weight distribution Mw/Mn of the polymer. After elapsing 48 hours from the start of the reaction, the reaction solution remaining in the test tube was cooled and exposed to the air for terminating the polymerization, and then subjected to the $^1$H-NMR analysis and the GPC analysis. As a result, after 48 hours, the monomer conversion was 44.9%, the number average molecular weight Mn was 10,600, and the molecular weight distribution Mw/Mn was 1.38. FIG. 1 shows the change of monomer conversion with respect to the polymerization time and the change of the number average molecular weight Mn and the molecular weight distribution Mw/Mn of the polymer with respect to the monomer conversion. The number average molecular weight Mn of the polymer was increased in proportion to the monomer conversion, from which the progress of the reaction as a living radical polymerization system was confirmed.

Figure 2:
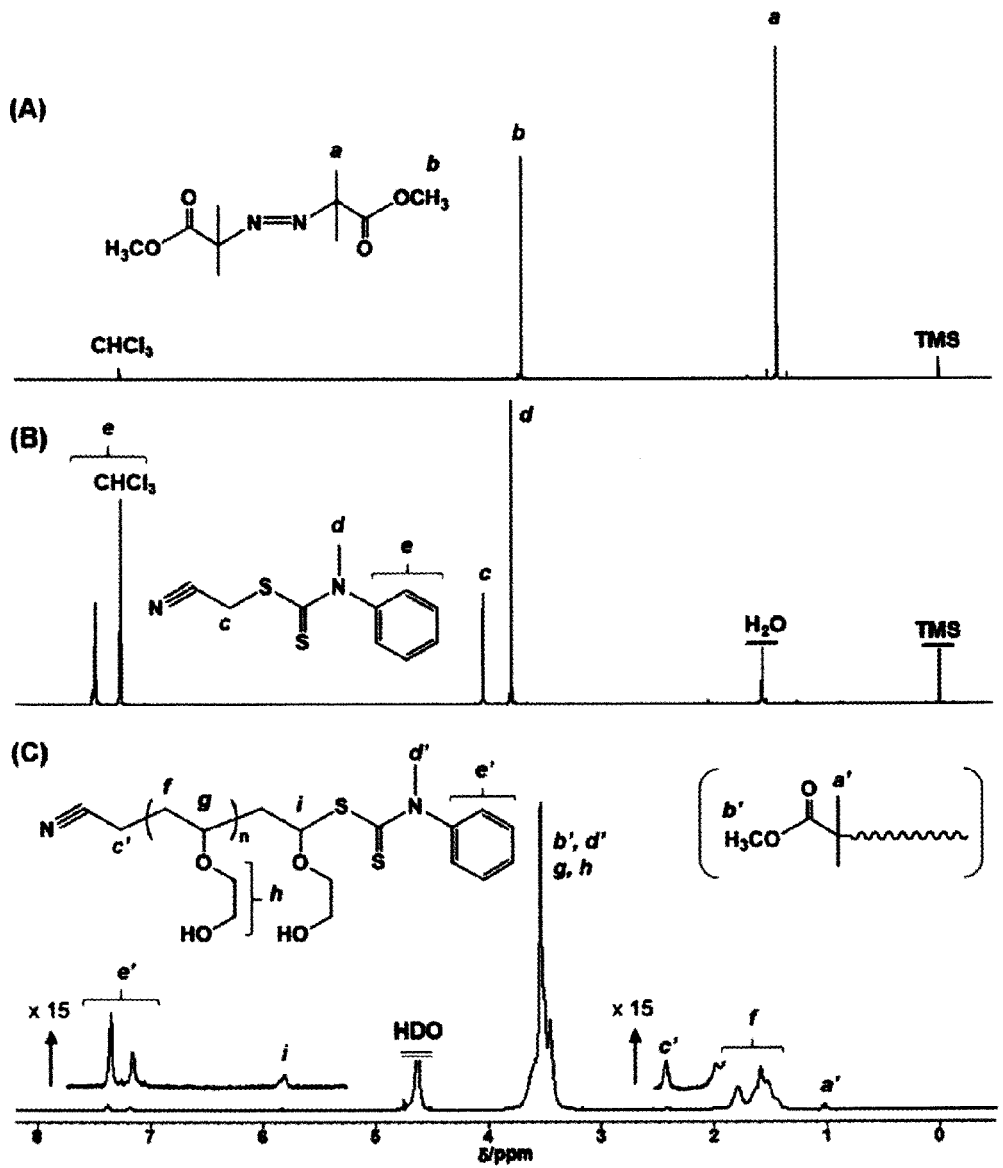
FIG. 2 is diagrams showing the $^1$H-NMR analysis results of the poly(2-hydroxyethyl vinyl ether) obtained in Example 1.

The reaction solution was purified through evaporation, and the purified polymer was subjected to the $^1$H-NMR analysis. As a result, the peak derived from the initiator was observed as an initiating end in addition to the structure derived from the RAFT agent (FIG. 2). The $^1$H-NMR analysis and the MALDI-TOF-MAS analysis performed therefor revealed that the ratio of the initiating end derived from the RAFT agent and the initiating end derived from the initiator was 54.5/45.5 in both the analyses. It was also confirmed that the terminal end was occupied by the structure derived from the RAFT agent.

Example 2

Synthesis Example of poly(2-hydroxyethyl vinyl ether) (2)

A poly(2-hydroxyethyl vinyl ether) was synthesized in the same manner as in Example 1 except that the ratio HEVE/CMPCD/V-601 was 200/1/0.2. FIG. 1 shows the change of monomer conversion, with respect to the polymerization time and the change of the number average molecular weight Mn and the molecular weight distribution Mw/Mn of the polymer with respect, to the monomer conversion. While the monomer conversion and the number average molecular weight Mn became lower than those in Example 1, the number average molecular weight Mn of the polymer was increased in proportion to the monomer conversion, from which the progress of the reaction as a living radical polymerization system was confirmed.

Example 3

Synthesis Example of poly(diethylene glycol monovinyl ether) (1)

Figure 3:
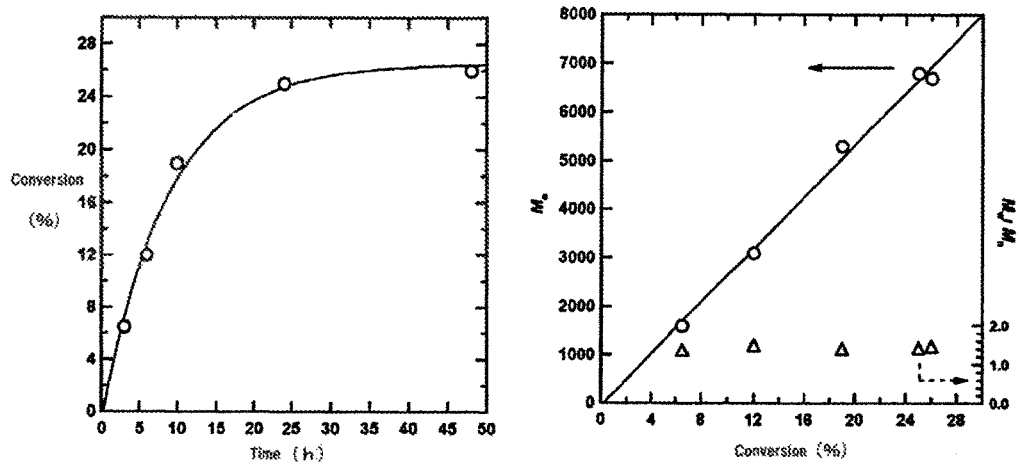
FIG. 3 is diagrams showing the change of monomer conversion with respect to the polymerization time and the change of the number average molecular weight Mn and the molecular weight distribution Mw/Mn of the polymer with respect to the monomer conversion in Example 3.

A poly(diethylene glycol monovinyl ether) was synthesized in the same manner as in Example 1 except that HEVE was changed to diethylene glycol monovinyl ether (hereinafter referred to as "DEGV"). As a result, after 48 hours, the monomer conversion was 26%, the number average molecular weight Mn was 6,700, and the molecular weight distribution Mw/Mn was 1.43. FIG. 3 shows the change of monomer conversion with respect to the polymerization time and the change of the number average molecular weight Mn and the molecular weight distribution Mw/Mn of the polymer with respect to the monomer conversion. While the monomer conversion and the number average molecular weight Mn became lower than those in Example 1 (HEVE), the number average molecular weight Mn of the polymer was increased in proportion to the monomer conversion, from which the progress of the reaction as a living radical polymerization system was confirmed also in DEGV.

Example 4

Synthesis Example of poly(4-hydroxybutyl vinyl ether) (1)

Figure 4:
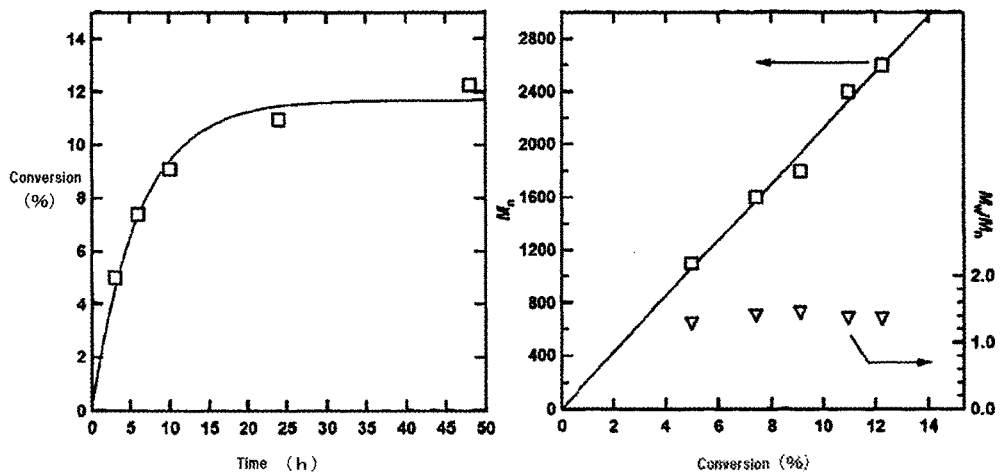
FIG. 4 is diagrams showing the change of monomer conversion with respect to the polymerization time and the change of the number average molecular weight Mn and the molecular weight distribution Mw/Mn of the polymer with respect to the monomer conversion in Example 4.

A poly(4-hydroxybutyl vinyl ether) was synthesized in the same manner as in Example 1 except that HEVE was changed to 4-hydroxybutyl vinyl ether (hereinafter referred to as "HBVE"). As a result, after 48 hours, the monomer conversion was 12%, the number average molecular weight Mn was 2,600, and the molecular weight distribution Mw/Mn was 1.39. FIG. 4 shows the change of monomer conversion with respect to the polymerization time and the change of the number average molecular weight Mn and the molecular weight distribution Mw/Mn of the polymer with respect to the monomer conversion, while the monomer conversion and the number average molecular weight Mn became lower than those in Example 1 (HEVE), the number average molecular weight Mn of the polymer was increased in proportion to the monomer conversion, from which the progress of the reaction as a living radical polymerization system was confirmed also in HBVE.

Example 5

Synthesis Example of poly(2-hydroxyethyl vinyl ether) (3)

10.0 g (113 mmol) of HEVE was weighed in a 50 mL egg-plant shaped flask, and to the egg-plant shaped flask, 0.052 g (0.23 mmol) of V-601 and 0.126 g (0.57 mmol) of CMPCD were added and sufficiently dissolved (HEVE/CMPCD/V-601=200/1/0.4). Subsequently, a stirring bar was added to the flask, and nitrogen was blown into the flash in an ice bath for deoxygenation. After the deoxygenation, the flask was sealed, and the polymerization reaction was started in an oil bath at 70° C. After elapsing 24 hours from the start of the reaction, the reaction solution was cooled and exposed to the air for terminating the polymerization. The reaction solution was purified through evaporation, the purified polymer was subjected to the $^1$H-NMR analysis (deuterated chloroform), the polymerization degree thereof was obtained by the weight method, and the polymerization degree per RAFT agent end was 53. As a result of the GPC analysis, the number average molecular weight Mn was 4,770, and the molecular weight distribution Mw/Mn was 1.33.

Example 6

Synthesis of (HEVE-b-HEVE) Block Copolymer 0.1 g (0.021 mmol) of the poly(2-hydroxyethyl vinyl ether) obtained in Example 5 as a macro chain transfer agent, 1.9 mg (0.0082 mmol) of V-601 as a radical polymerization initiator, and 1.45 g (16 mmol) of HEVE as a radically polymerizable monomer were added to a test tube and sufficiently dissolved (HEVE/macro chain transfer agent/V-601=300/1/0.4). Subsequently, a stirring bar was added to the test tube, and nitrogen was blown into the test tube in an ice bath for deoxygenation. After the deoxygenation, the test tube was sealed, and the polymerization reaction was started in an oil bath at 70° C. After elapsing 48 hours from the start of the reaction, the reaction solution was cooled and exposed to the air for terminating the polymerization. The reaction solution was purified through evaporation, the purified polymer was subjected to the $^1$H NMR analysis (deuterated chloroform), and as a result, the monomer conversion was 15.2%. The polymerization degree thereof was obtained by the weight method, and the polymerization degree per RAFT agent end was 120. As a result of the GPC analysis, the number average molecular weight Mn was 11,800, and the molecular weight distribution Mw/Mn was 1.34.

Example 7

Figure 5:
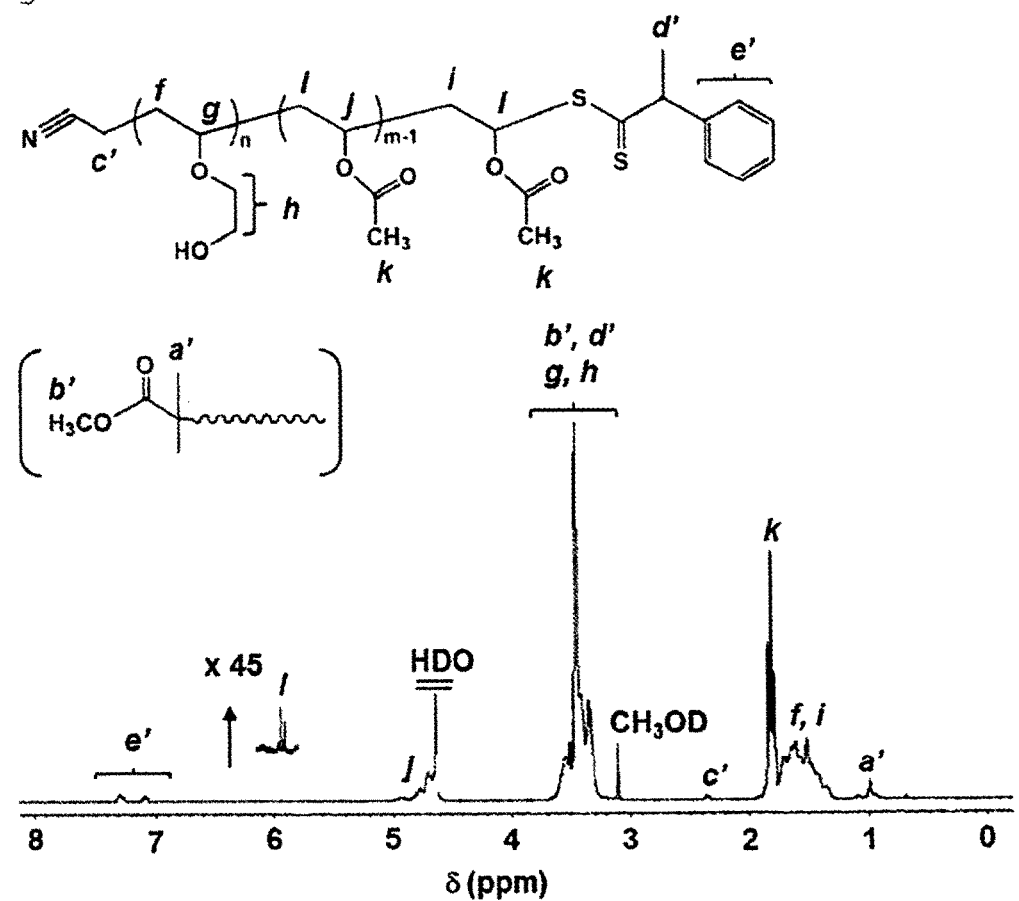
FIG. 5 is diagrams showing the $^1$H-NMR analysis results of the block copolymer obtained in Example 7.

Synthesis of (HEVE-b-vinyl acetate) Block Copolymer 0.1 g (0.021 mmol) of the poly(2-hydroxyethyl vinyl ether) obtained in Example 5 as a macro chain transfer agent, 1.9 mg (0.0082 mmol) of V-601 as a radical polymerization initiator, 1.42 g (16.5 mmol) of vinyl acetate (hereinafter referred to as "VAc") as a radically polymerizable monomer, and 0.651 g of ethanol as a solvent (ethanol concentration: 30% by mass) were added to a test tube and sufficiently dissolved (VAc/macro chain transfer agent/V-601=300/1/0.4). Subsequently, a stirring bar was added to the test tube, and nitrogen was blown into the test tube in an ice bath for deoxygenation. After the deoxygenation, the test tube was sealed, and the polymerization reaction was started in an oil bath at 70° C. After elapsing 48 hours from the start of the reaction, the reaction solution was cooled and exposed to the air for terminating the polymerization. The reaction solution was purified through evaporation, the purified polymer was subjected to the $^1$H-NMR analysis (deuterated water and deuterated methanol), and as a result, the monomer conversion was 20.6%. The polymerization degree thereof was obtained by the weight method, and the polymerization degree per RAFT agent end was 165. As a result of the GPC analysis, the number average molecular weight Mn was 12,300, and the molecular weight distribution Mw/Mn was 1.71. FIG. 5 shows the $^1$H-NMR measurement results of the resulting block copolymer.

Example 8

Synthesis of (HEVE-b-N-Vinylpyrrolidone) Block Copolymer

Figure 6:
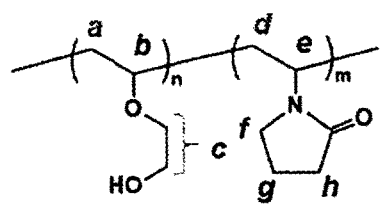
FIG. 6 is diagrams showing the $^1$H-NMR analysis results of the block copolymer obtained in Example 8.
Figure 6:
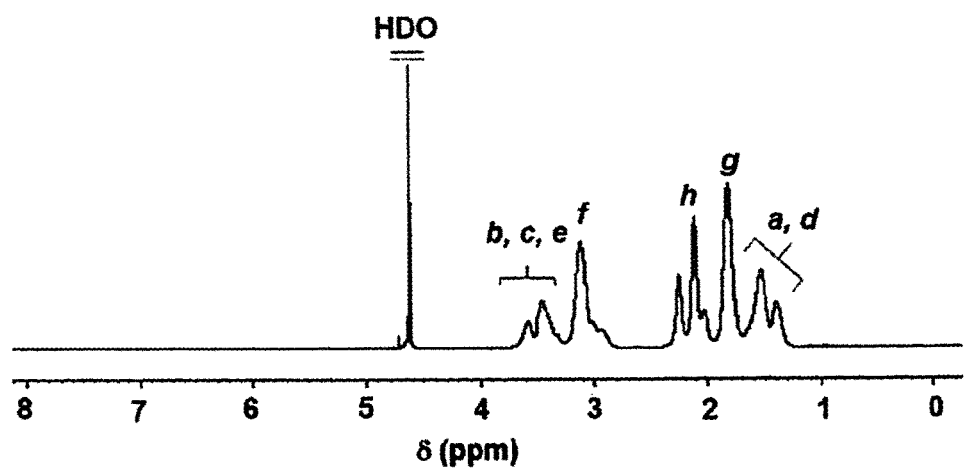

A block copolymer was synthesized in the same manner as in Example 6 except that a poly(2-hydroxyethyl vinyl ether) having a polymerization degree of 47, a number average molecular weight Mn of 4,100, and a molecular weight distribution Mw/Mn of 1.34 obtained in the same manner as in Example 5 was used as a macro chain transfer agent, N-vinylpyrrolidone was used as a radically polymerizable monomer, 1,4-dioxane was used as a polymerization solvent (1,4-dioxane concentration: 20% by mass), and the ratio N-vinylpyrrolidone/macro chain transfer agent/V-601 was 400/1/0.4. As a result of the $^1$H-NMR analysis (deuterated water), the monomer conversion was 90.3%. The polymerization degree thereof was obtained by the weight method, and the polymerization degree per RAFT agent end was 36. As a result of the GPC analysis, the number average molecular weight Mn was 11,500, and the molecular weight distribution Mw/Mn was 2.57. FIG. 6 shows the $^1$H-NMR measurement results of the resulting block copolymer.

Example 9

Synthesis of (VAc-b-HEVE) Block Copolymer

A polyvinyl acetate having a polymerization degree of 93, a number average molecular weight Mn of 10,400, and a molecular weight distribution Mw/Mn of 1.21 was obtained in the same manner as in Example 5 except that vinyl acetate was used as the monomer.

0.5 g (0.061 mmol) of the polyvinyl acetate obtained as a macro chain transfer agent, 5.6 mg (0.0243 mmol) of V-601 as a radical polymerization initiator, and 2.15 g (24.3 mmol) of HEVE as a radically polymerizable monomer, were added to a test tube and sufficiently dissolved (HEVE/macro chain transfer agent/V-601=400/1/0.4).

Subsequently, a stirring bar was added to the test tube, and nitrogen was blown into the test tube in an ice bath for deoxygenation. After the deoxygenation, the test tube was sealed, and the polymerization reaction was started in an oil bath at 70° C. After elapsing 48 hours from the start of the reaction, the reaction solution was cooled and exposed to the air for terminating the polymerization. The reaction solution was purified through evaporation, the purified polymer was subjected to the $^1$H-NMR analysis (deuterated water and deuterated methanol), and as a result, the monomer conversion was 28.2%. The polymerization degree thereof was obtained by the weight method, and the polymerization degree per RAFT agent end was 113. As a result of the GPC analysis, the number average molecular weight Mn was 16,000, and the molecular weight distribution Mw/Mn was 1.49.

Example 10

Synthesis of (HEVE-r-VAc) Random Copolymer (1)

2.56 g (29 mmol) of HEVE, 2.5 g (29 mmol) of VAc, 0.027 g (0.11 mmol) of V-601 as a radical polymerization initiator, and 0.0645 g (0.29 mmol) of CMPCD as a RAFT agent were added to a test tube and sufficiently dissolved (HEVE/VAc=100/100, CMPCD/V-601=5/2). Subsequently, a stirring bar was added to the test tube, and nitrogen was blown into the test tube in an ice bath for deoxygenation. After the deoxygenation, the test tube was sealed, and the polymerization reaction was performed in an oil bath at 70° C.

Figure 7:
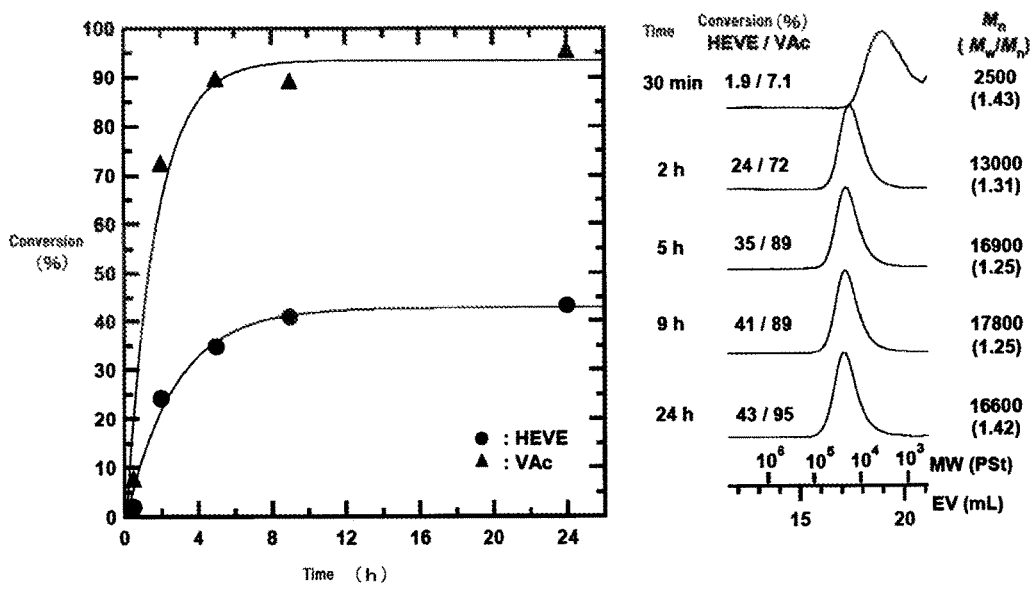
FIG. 7 is diagrams showing the change of monomer conversion, and the number average molecular weight Mn and the molecular weight distribution Mw/Mn of the polymer, with respect to the polymerization time of the random copolymer obtained in Example 10.

After elapsing an arbitrary polymerization time, the monomer conversion, and the number average molecular weight Mn. and the molecular weight distribution Mw/Mn of the polymer were calculated in the same manner as in Example 1. As a result, after elapsing 24 hours, the monomer conversion was 43% for HEVE and 95% for VAc, and the resulting polymer had a number average molecular weight Mn of 16,600 and a molecular weight distribution Mw/Mn of 1.42. The compositional ratio thereof was HEVE/VAc=31/69. FIG. 7 shows the change of monomer conversion, and the number average molecular weight Mn and the molecular weight distribution Mw/Mn of the polymer, with respect to the polymerization time.

Example 11

Synthesis of (HEVE-r-VAc) Random Copolymer (2)

A random copolymer was obtained in the same manner as in Example 10 except that the charge concentration of the monomers was changed to HEVE/VAc=1/2. After elapsing 24 hours, the monomer conversion was 52% for HEVE and 92% for VAc, and the resulting polymer had a number average molecular weight Mn of 32,200 and a molecular weight distribution Mw/Mn of 1.21. The compositional ratio thereof was HEVE/VAc=22/78.

Example 12

Synthesis of (HEVE-r-VAc) Random Copolymer (3)

A random copolymer was obtained in the same manner as in Example 10 except that the charge concentration of the monomers was changed to HEVE/VAc=2/1. After elapsing 24 hours, the monomer conversion was 33% for HEVE and 92% for VAc, and the resulting polymer had a number average molecular weight Mn of 17,400 and a molecular weight distribution Mw/Mn of 1.38. The compositional ratio thereof was HEVE/VAc=41/59.

Reference Example 1

Synthesis of (HEVE-r-vinyl Alcohol) Random Copolymer

Figure 8:
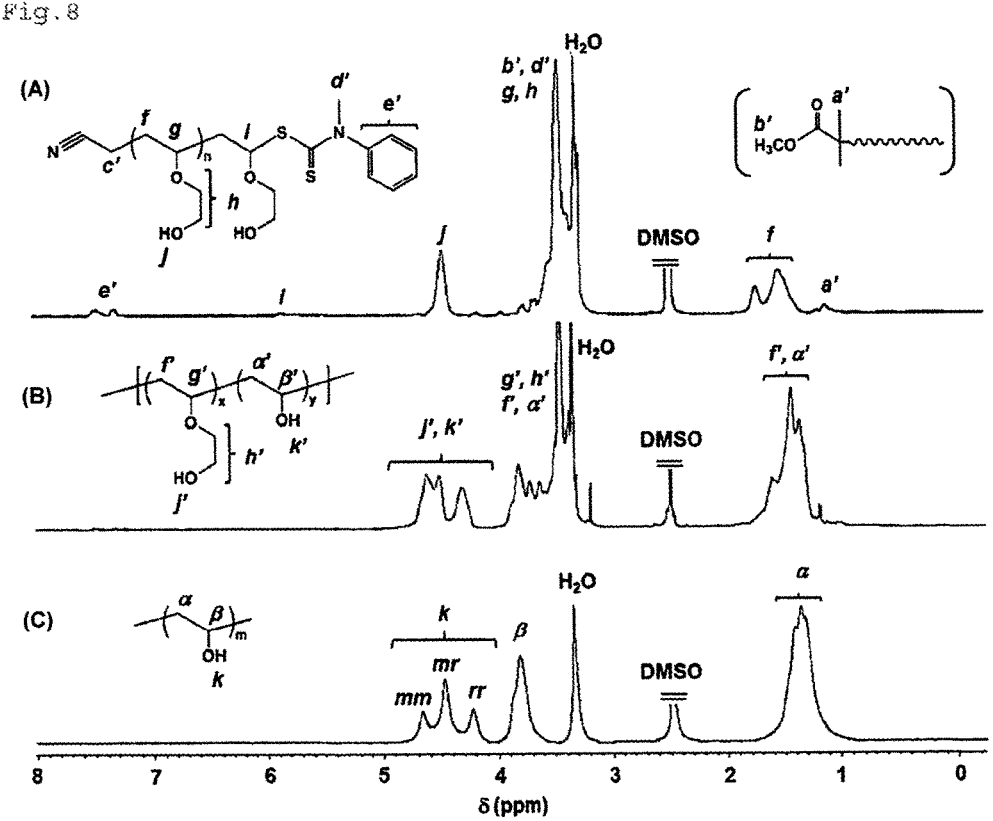
FIG. 8 is diagrams showing the $^1$H-NMR analysis results of the polymer obtained in Reference Example 1.

A (HEVE-r-vinyl alcohol) random copolymer was synthesized by saponifying the (HEVE-r-VAc) random copolymer obtained in Example 10. Specifically, 0.37 g of the copolymer obtained in Example 10 was dissolved in 18.14 g of methanol to prepare a 2% by mass polymer solution. 18.51 g of a 2% by mass KOH methanol solution was added thereto, and reaction was performed under stirring for 24 hours at room temperature. After 24 hours, a HCl methanol solution having an appropriate concentration was added thereto to neutralize the solution until reaching neutral checked with pH test paper. After removing methanol through evaporation, the resulting polymer was dissolved in water and purified through dialysis. The polymer after the purification was dissolved in deliberated DMSO and confirmed for the structure by the $^1$H-NMR analysis. FIG. 8 shows the $^1$H-NMR measurement results of the resulting copolymer.

Comparative Example 1

Synthesis Example of Poly(2-Hydroxyethyl Vinyl Ether) (4)

Living radical polymerization of 2-hydroxyethyl vinyl ether was performed in the same manner as in Example 1 except that the RAFT agent was changed to 2-phenylpropan-2-yl benzodithioate, but after 24 hours, the number average molecular weight Mn was 320, and the molecular weight distribution Mw/Mn was 1.04, thus failing to provide the target polymer. In the $^1$H-NMR analysis, a peak of acetal was confirmed.

Comparative Example 2

Synthesis Example of poly(2-hydroxyethyl vinyl ether) (5)

Living radical polymerization of 2-hydroxyethyl vinyl ether was performed in the same manner as in Example 1 except that the RAFT agent was changed to cyanomethyl dodecyltrithiocarbonate, but after 24 hours, the number average molecular weight Mn was 700, and the molecular weight distribution Mw/Mn was 1.66, thus failing to provide the target polymer.

INDUSTRIAL APPLICABILITY

The method for producing an alkenyl ether polymer and a block copolymer of the invention can provide an alkenyl ether polymer having a molecular weight, a molecular weight distribution, and a composition that are controlled, and a block copolymer thereof. The polymer of the invention can be provided, as a macro chain transfer agent.

The alkenyl ether polymer and the block copolymer thereof thus provided are a polyvinyl ether having a hydroxyl group on the side chain thereof, have characteristics including hydrophilicity, adhesiveness to a substrate, crosslinking reactivity, and the like, and are useful for such purposes as an adhesive, a coating material, a lubricant, an elastomer, grease, and the like.

The invention claimed is:

1. A method for producing an alkenyl ether polymer, comprising at least performing living radical polymerization of an alkenyl ether having a hydroxyl group represented by formula (2):

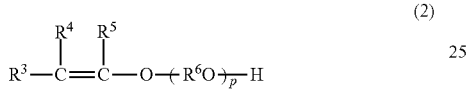

wherein $R^3$, $R^4$, and $R^5$ each independently represent a hydrogen atom or an alkyl group; $R^6$ represents a linear or branched alkylene group or an alkylene group comprising an alicyclic structure; and p represents 1, 2, or 3, in the presence of a dithiocarbamate ester represented by formula (1) as a chain transfer agent and a radical polymerization initiator:

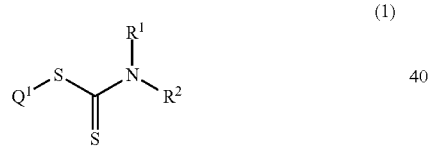

wherein $Q^1$ represents a functional group capable of activating vinyl carbon for free radical addition through detachment as a radical; and $R^1$ and $R^7$ each independently represent an alkyl group, an aryl group, or a nitrogen-containing heterocyclic group, in which $R^1$ and $R^2$ may be bonded to each other to form a heterocyclic ring.

2. The method according to claim 1, wherein the functional group represented by $Q^1$ is a group represented by formula (1a):

wherein $X^1$ represents a cyano group, an aryl group, an alkoxycarbonyl group, a carboxyl group, or an N-substituted carbamoyl group; and $R^a$ and $R^b$ each independently represent a hydrogen atom, a halogen atom, an alkyl group, an aryl group, an alkoxycarbonyl group, —$(CH_2)_k$—OH, or —$(CH_2)_k$—COOY, wherein Y represents a hydrogen atom or an N-succinimidyl group; and k represents an integer of from 1 to 5.

3. The method according to claim 1, wherein the radical polymerization initiator is an azo compound.

4. The method according to claim 1, wherein the alkenyl ether represented by the formula (2) and a radically polymerizable vinyl monomer that is different therefrom are copolymerized.

5. The method according to claim 4, wherein the radically polymerizable vinyl monomer is at least one monomer selected from the group consisting of styrene and a styrene derivative, (meth)acrylic acid and a (meth)acrylic acid derivative, (meth)acrylamide and a (meth)acrylamide derivative, (meth)acrylonitrile, isoprene, 1,3-butadiene, ethylene, vinyl acetate, vinyl chloride, vinylidene chloride, N-vinylindole, N-vinylphthalimide, N-vinylpyrrolidone, N-vinylcarbazole, and N-vinylcaprolactam.

6. A macro chain transfer agent comprising at least an end structure comprising a dithiocarbamate group represented by formula (3):

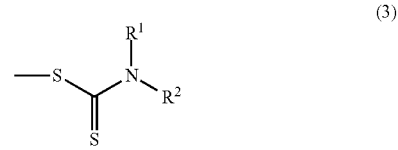

wherein $R^1$ and $R^2$ each independently represent an alkyl group, an aryl group, or a nitrogen-containing heterocyclic group, or $R^1$ and $R^2$ may be bonded to each other to form a heterocyclic ring, and a repeating unit derived from a hydroxyl group-containing alkenyl ether represented by formula (4):

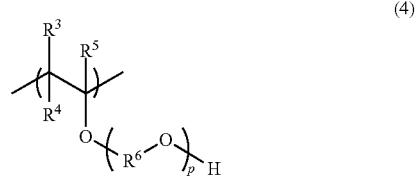

wherein $R^3$, $R^4$, and $R^3$ each independently represent a hydrogen atom or an alkyl group; $R^6$ represents a linear or branched alkylene group or an alkylene group comprising an alicyclic structure; and p represents 1, 2, or 3.

7. The macro chain transfer agent according to claim 6, wherein the macro chain transfer agent is capable of performing reversible addition fragmentation chain transfer polymerization.

8. A macro chain transfer agent capable of performing reversible addition fragmentation chain transfer polymerization represented by formula (5):

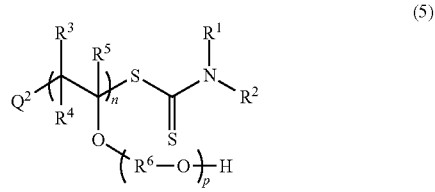

wherein $Q^2$ represents a functional group capable of activating vinyl carbon for free radical addition through detachment as a radical; $R^1$ and $R^2$ each independently represent an alkyl group, an aryl group, or a nitrogen-containing heterocyclic group, or $R^1$ and $R^2$ may be bonded to each other to form a heterocyclic ring; $R^3$, $R^4$, and $R^5$ each independently represent a hydrogen atom or an alkyl group; $R^6$ represents a linear or branched alkylene group or an alkylene group compromising an alicyclic structure; n represents a number of repetition of an alkenyl ether unit; and p represents 1, 2, or 3.

9. The macro chain transfer agent according to claim 8, wherein the functional group represented by $Q^2$ is a group represented by formula (5a):

wherein $X^2$ represents a cyano group, an aryl group, an alkoxycarbonyl group, a carboxyl group, or an N-substituted carbamoyl group; and $R^c$ and $R^d$ each independently represent a hydrogen atom, a halogen atom, an alkyl group, an aryl group, an alkoxycarbonyl group, $-(CH_2)_k-OH$, or $-(CH_2)_k-COOY$, wherein Y represents a hydrogen atom or an N-succinimidyl group; and k represents an integer of from 1 to 5.

10. A method for producing a block copolymer, comprising polymerizing a radically polymerizable vinyl monomer through living radical polymerization in the presence of the macro chain transfer agent according to claim 6 and a radical polymerization initiator.

11. The method according to claim 10, wherein the radical polymerization initiator is an azo compound.

12. The method according to claim 10, wherein the radically polymerizable vinyl monomer is at least one monomer selected from the group consisting of styrene and a styrene derivative, (meth)acrylic acid and a (meth)acrylic acid derivative, (meth)acrylamide and a (meth)acrylamide derivative, (meth)acrylonitrile, isoprene, 1,3-butadiene, ethylene, vinyl acetate, vinyl chloride, vinylidene chloride, N-vinylindole, N-vinylphthalimide, N-vinylpyrrolidone, N-vinylcarbazole, and N-vinylcaprolactam.

* * * * *

UNITED STATES PATENT AND TRADEMARK OFFICE
CERTIFICATE OF CORRECTION

PATENT NO. : 10,370,478 B2
APPLICATION NO. : 15/572384
DATED : August 6, 2019
INVENTOR(S) : Shinji Sugihara It is certified that error appears in the above-identified patent and that said Letters Patent is hereby corrected as shown below:

In the Claims

Claim 1, Column 19, Line 47, "and $R^1$ and $R^7$ each" should read -- and $R^1$ and $R^2$ each --;

Claim 6, Column 20, Line 45, "wherein $R^3$, $R^4$, and $R^3$" should read -- wherein $R^3$, $R^4$, and $R^5$ --;

Claim 8, Column 21, Lines 8-9, "an alkylene group compromising" should read -- an alkylene group comprising --.

Signed and Sealed this
Twelfth Day of November, 2019

Andrei Iancu
*Director of the United States Patent and Trademark Office*